3,117,169
DEHYDROGENATION PROCESS AND BORON NITRIDE-CHROMIUM OXIDE CATALYST THEREFOR
John R. Coley, Gary, Ind., and Samuel W. Harris, Chicago, Ill., assignors to Standard Oil Company, Chicago, Ill., a corporation of Indiana
No Drawing. Filed Aug. 16, 1961, Ser. No. 131,730
4 Claims. (Cl. 260—680)

This application relates to a process of dehydrogenating hydrocarbons and a catalytic composition for such process.

The dehydrogenation of various types of hydrocarbons has become of increasing commercial importance in recent years, primarily because of the utility of olefinic hydrocarbons as intermediates in the preparation of other compounds. By way of illustration, but not by way of limitation, the dehydrogenation of butane to butene, the dehydrogenation of butene to butadiene, the dehydrogenation of ethyl benzene to styrene, and the dehydrogenation of paraffins to olefins for use as a feed to the Oxo process are examples of currently-commercialized dehydrogenation reactions.

Catalysts comprising chromium oxides supported on a porous inorganic supporting material are known in the art as catalysts for the dehydrogenation of hydrocarbons as well as other hydrocarbon conversion reactions, such as dehydrocyclization (sometimes referred to as aromatization), desulfurization, and the reforming of hydrocarbons. However, a disadvantageous characteristic of dehydrogenation reactions, particularly the dehydrogenation of a paraffinic or aliphatic radical, is the cracking of the paraffinic or aliphatic radical to a molecule of lower molecular weight. The cracking of a hydrocarbon feed to molecules of lesser molecular weight is, by-and-large, an undesirable reaction, leading to by-products of lesser value. For instance, when dehydrogenating butane, cracking results in the undesirable production of molecules having 1 to 3 carbon atoms, rather than the desired butene. Similarly, when dehydrogenating ethyl benzene to styrene, the cracking may lead to toluene or benzene.

We have now discovered, quite unexpectedly, that by conducting a dehydrogenation reaction in the presence of a catalyst comprising from about 1 to 20 weight percent boron nitride and about 2 to 30 weight percent chromium oxide supported on a porous inorganic support, preferably predominantly alumina, that the amount of feed converted to the dehydrogenated product is increased as the amount of cracking is decreased.

Boron nitride is a white talc-like substance of low bulk density, in the order of 0.1 gram per ml., having desirable lubricating characteristics. It has been characterized as "white graphite" and, as a matter of fact, has an X-ray diffraction pattern very similar to that of graphite. Boron nitride is exceptionally refractory, being stable in either reducing or oxidizing atmospheres at temperatures up to and above 1000° C. Its melting point is about 3000° C. As an illustration of boron nitride's refractory properties, molten iron does not wet its surface, but instead forms a mercury-like droplet when melted in a boron nitride lined crucible. Because of its refractory properties, the promoting or co-catalytic effect of boron nitride when used in a chromia-alumina catalyst is an unexpected discovery.

The boron nitride-containing chromia-alumina catalysts may be prepared by a variety of procedures. Basic preparation techniques for chromia-alumina catalysts are disclosed by Dr. R. C. Archibald et al., "Promoted Chromia-Alumina Catalyst for Converting n-Heptane to Toluene," 37 Industrial and Engineering Chemistry 356 (1945), and references cited therein, and by Dr. Paul H. Emmett in "Catalysis," volume III. Broadly speaking, chromia-alumina catalysts are made by mixing aqueous solutions of chromium and aluminum salts and precipitating the hydroxides thereof, followed by drying and calcining. In another somewhat similar preparation, a chrominum sol is added to alumina sol prepared by dissolving metallic aluminum in weakly acidified water in the presence of mercury or a compound of mercury, and thereafter cogelling the mixture using ammonia. The other basic preparation procedure is by impregnating dried, and optionally calcined, alumina with a solution of a chromium compound, and thereafter drying and calcining.

In making a catalytic composition comprising boron nitride and chromium oxide, the boron nitride may be added to dried alumina either before or after the chromium has been added, and before the alumina is calcined. Alternatively, boron nitride may be added to previously calcined alumina to which the chromium compound may or may not have been already added. In either of the foregoing methods, the boron nitride powder is physically admixed with ground alumina, and subsequently shaped and calcined. As a result of its low bulk density, the boron nitride may also be added to a liquid solution or sol when the catalyst is made by the coprecipitation or cogelling methods. Sufficient boron nitride is added to comprise from about 1 to 20 weight percent of the finished catalyst, preferably from about 3 to 10%. An excessive amount of boron nitride, above about 20% tends to reduce unduly the primary activity of the catalyst and is therefore undesirable.

Because of its refractory properties, the inclusion of boron nitride in a catalytic composition herein does not increase the composition's susceptibility to poisons or high temperature. However, it is advantageous to minimize contact at high temperature, e.g., about 1000° F. or higher, of the catalytic composition with water vapor. This is because of the tendency of boron nitride to hydrolyze to ammonia and boric acid.

The preferred support for the boron nitride-chromium oxide catalyst is alumina. As used herein, alumina refers to the substantially anhydrous aluminas containing only a small amount of water, such as gamma-alumina and eta-alumina, but not including corundum, which is sometimes referred to as alpha-alumina. However, it is to be understood that the support may comprise other inorganic materials, preferably in an amount less than the amount of alumina used, such as silica, magnesia, and various synthetic or naturally occuring silicates.

Furthermore, in addition to boron nitride and chromium oxide as the principal catalytic ingredients, additional catalytic constituents may be incorporated into the catalyst. Such other constituents are known in the art and include beryllia, molybdena, titania, vanadia, zirconia and oxides of phosphorus. United States Patent No. 2,337,190 to Greensfelder et al. discloses that certain alkali metals, particularly potassium, are advantageous promoters in chromia catalysts.

Illustrative hydrocarbon types which may be dehydrogenated using the boron nitride-containing catalyst as herein described include paraffins having from 4 to about 8 or 9 carbon atoms per molecule, naphthenes and alkyl naphthenes, and alkyl benzenes having an alkyl group comprising 2 or more carbon atoms. In addition, mono-olefins may be dehydrogenated to diolefins, e.g., butene to butadiene.

The hydrocarbon feed may be contacted under dehydrogenation conditions with the catalyst in the form of a fixed or fluid bed. Suitable dehydrogenation conditions are weight hourly space velocities in the range of about ½ to 10, pressures from atmospheric or sub-atmospheric up to 100–200 p.s.i.g., and temperatures in the range of about 350 to 650° C. The dehydrogenation is advantageously conducted in the presence of hydrogen in order to minimize deactivation of the catalyst by deposition of carbonaceous deposits, even though increasing hydrogen partial pressure tends to suppress the dehydrogenation reaction. The temperature selected will depend in part upon the character and the molecular weight of the feed, with higher temperatures falling within the above-mentioned range being used for lower molecular weight hydrocarbons given within any hydrocarbon-type classification.

Carbon deposits may be removed from the catalyst by burning in air or air diluted with an inert gas, such as flue gas, at temperatures in the range of 1000–1200° F., preferably at a temperature of at least about 1100° F.

Normal pentane was dehydrogenated using a boron nitride-containing chromia catalyst (herein designated catalyst A). A solution of 94.8 grams of $CrO_3$ and 34.2 grams of potassium nitrate dissolved in 100 ml. of water was used to impregnate 312 grams of alumina pellets. The alumina was grade H–41. After impregnation, the pellets were dried overnight at 120° C., and then calcined for 4 hours at 1100–1200° F. The calcined impregnated alumina comprised 18% $Cr_2O_3$ and 4% $K_2O$. Thereafter, a portion of the pellets were ground up to a particle size of 100 mesh or smaller. Amorphous boron nitride in the amount of 5.2 grams was physically admixed with 130.3 grams of ground pellets. Sterotex was added to one mixture and the whole pelleted and calcined for 6 hours at 1000° F. The completed catalyst contained 3.8 weight percent boron nitride.

The above-described catalyst A was used to dehydrogenate normal pentane. The amount of catalyst used was 50.1 grams. The run was conducted at atmospheric pressure (731 mm. Hg) at a temperature varying between 1049 to 1106° F., but which was held throughout most of the run at about 1050° F. The volumetric hourly space velocity was 2.4. The products from this run were 4.6 weight percent coke, 12.6% gas ($C_4$ and lighter), 29.9% $C_5$ olefins (22.0% pentenes and 6.9% methyl butenes), 1.5% iso-pentane, 40.0% n-pentane (charge) and 9.0% $C_6$ and heavier. Loss was 3.4%.

By way of comparison, a similar run was conducted using a catalyst (catalyst B) which did not contain boron nitride. H–41 alumina pellets in the amount of 156 grams were impregnated with a solution of 17.2 grams of potassium nitrate and 47.4 grams of $CrO_3$ (equivalent to 36.0 grams of $Cr_2O_3$) dissolved in 100 mm. of water. The impregnated pellets were dried at 100° C., and then calcined overnight at 1100° F.

The amount of catalyst B used in one run was 53.6 grams. Again, normal pentane was the feed. The dehydrogenation was conducted at atmospheric pressure, a volumetric hourly space velocity of 2.4 and at temperatures within the range of 1053 to 1107° F., primarily at 1055° F. The reaction products comprised 3.5% coke, 16.2% gas ($C_4$ and lighter), only 23.8% $C_5$ olefins (20.3% pentenes and 3.5% methyl butenes), 0.6% iso-pentane, 45.0% n-pentane and 8.4% $C_6$ and heavier. Loss was 2.5%. The $C_5+$ material contained 29.9% olefins and 68.5% paraffins.

Thus, it may be seen that inclusion of boron nitride in the catalyst increased the yield of product $C_5+$ olefins from 23.8% on charge to 29.9%, an improvement in yield on charge of 25%.

Prior to conducting each of the foregoing runs, the calcined catalyst used in each run was treated in the reactor by passing flowing hydrogen through the reactor at reaction temperature and atmospheric pressure for about ¼ hour.

The reactor used was a steel pipe having an inside diameter of 0.83 inch and a length of about 40 inches. The reactor was electrically heated. Temperature measurement was made by an axially aligned thermocouple. The normal pentane was charged to the reactor by a positive displacement pump. Bottled hydrogen was used. The effluent from the reactor was cooled and the gaseous and liquid phases analyzed.

The boron nitride-containing chromia catalyst may advantageously be used to convert butene to butadiene. Typically, when converting butene-1 to butadiene using alkalized chromia-alumina catalyst and dehydrogenation conditions of 1110° F., a pressure of 100 mm. Hg and a liquid hourly space velocity of 2, the yield is 18% butadiene, 4% $C_3$ and lighter and 2% coke, with the remainder of the charge passing through unconverted. When using the same catalyst to which boron nitride has been added in accordance with the foregoing description, the yield of butadiene will be increased to about 20.5%, with $C_3$ and lighter products amounting to 3.8% and coke of 2.1%.

Having thus described the invention, what is claimed is:

1. A process of dehydrogenating hydrocarbons which comprises contacting a hydrocarbon under dehydrogenation conditions with a catalyst comprising about 1 to 20 weight percent boron nitride and about 2 to 30 weight percent chromium oxide supported on gamma-alumina.

2. A process of dehydrogenating hydrocarbons which comprises contacting a hydrocarbon under dehydrogenation conditions with a catalyst comprising about 1 to 20 weight percent boron nitride and about 2 to 30 weight percent chromium oxide supported on eta-alumina.

3. A catalytic composition comprising from about 1 to 20 weight percent boron nitride and about 2 to 30 weight percent chromium oxide supported on gamma-alumina.

4. A catalytic composition comprising from about 1 to 20 weight percent boron nitride and about 2 to 30 weight percent chromium oxide supported on eta-alumina.

References Cited in the file of this patent

UNITED STATES PATENTS

| | | |
|---|---|---|
| 2,745,763 | Veltz | May 15, 1956 |
| 2,800,518 | Pitzer | July 23, 1957 |
| 2,888,738 | Taylor | June 2, 1959 |
| 2,994,727 | Appell et al. | Aug. 1, 1961 |